(12) United States Patent
Li et al.

(10) Patent No.: US 6,656,614 B1
(45) Date of Patent: Dec. 2, 2003

(54) METHOD FOR MANUFACTURING MAGNETIC MEDIA WITH TEXTURED CSS LANDING ZONE FORMED BY ION IMPLANTATION, AND MEDIA OBTAINED THEREBY

(75) Inventors: Xinwei Li, Milpitas, CA (US); Xiaoding Ma, Fremont, CA (US); Huan Tang, Los Altos, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 90 days.

(21) Appl. No.: 09/986,085

(22) Filed: Nov. 7, 2001

Related U.S. Application Data
(60) Provisional application No. 60/295,886, filed on Jun. 4, 2001.

(51) Int. Cl.[7] .................................................. G11B 5/66
(52) U.S. Cl. .................... 428/694 ST; 428/694 SL; 428/694 SG; 428/900; 427/128; 427/129; 427/130; 264/430; 264/483; 204/192.2; 204/192.34; 204/192.1
(58) Field of Search ...................... 428/694 ST, 694 SL, 428/694 SG, 900; 427/128–130; 264/430, 483; 204/192.2, 192.34, 192.1

(56) References Cited

U.S. PATENT DOCUMENTS

| | | | |
|---|---|---|---|
| 4,013,502 A | | 3/1977 | Staples |
| 4,743,493 A | * | 5/1988 | Sioshansi et al. ........... 428/217 |
| 5,268,207 A | | 12/1993 | Kruger et al. |
| 5,500,296 A | | 3/1996 | Inoue et al. |
| 5,550,696 A | | 8/1996 | Nguyen |
| 5,714,207 A | | 2/1998 | Kuo |
| 5,851,475 A | | 12/1998 | Komvopoulos et al. |
| 5,942,279 A | | 8/1999 | Wudu |
| 6,117,499 A | | 9/2000 | Wong et al. |
| 6,200,441 B1 | | 3/2001 | Gornicki et al. |
| 6,368,425 B1 | * | 4/2002 | Segar ......................... 148/239 |

OTHER PUBLICATIONS

Terris, et al, "Ion–Beam Patterning Of Magnetic Films Using Stencil Masks" American Institute of Physics, Applied Physics Letters, vol. 75, No. 3, pp. 403–405, Jul. 19, 1999.

* cited by examiner

*Primary Examiner*—Leszek Kiliman
(74) *Attorney, Agent, or Firm*—McDermott, Will & Emery

(57) ABSTRACT

A method of texturing the surface of a CSS/landing zone of a substrate for a magnetic recording medium, comprising steps of:
(a) providing a disk-shaped substrate having a surface;
(b) providing a patterned mask in overlying relation to the substrate surface,
(c) selectively implanting ions in portions of the surface of the CSS/landing zone exposed by the patterned mask openings, whereby the height of the selectively ion-implanted portions is increased or decreased relative to the height of non-ion-implanted portions of the CSS/landing zone to form bumps or depressions, thereby providing the surface of the CSS/landing zone with a texture for reducing stiction and friction when the medium is used with a low flying height read/write transducer.

Embodiments of the invention include hard disk magnetic recording media with textured CSS/landing zones produced by the inventive ion implation methodology.

20 Claims, 2 Drawing Sheets

US 6,656,614 B1

METHOD FOR MANUFACTURING MAGNETIC MEDIA WITH TEXTURED CSS LANDING ZONE FORMED BY ION IMPLANTATION, AND MEDIA OBTAINED THEREBY

CROSS-REFERENCE TO PROVISIONAL APPLICATION

This application claims priority from U.S. provisional patent application Serial No. 60/295,886 filed Jun. 4, 2001, the entire disclosure of which is incorporated herein by reference.

FIELD OF THE INVENTION

The present invention relates to a method for texturing substrate surfaces by means of ion implantation processing, e.g., substrates utilized in the manufacture of magnetic recording media, and to magnetic media obtained thereby. The invention has particular utility in texturing the CSS landing zone of hard disk magnetic media such as are employed in computer-related applications.

BACKGROUND OF THE INVENTION

Hard disk-type magnetic media are widely utilized in various applications, particularly in the computer industry. A conventional longitudinal recording, hard magnetic disk-type medium 1 commonly employed in computer-related applications is schematically depicted in FIG. 1, and comprises a substantially rigid, non-magnetic metal substrate 10, typically of an aluminum (Al) alloy, such as an aluminum-magnesium (Al—Mg) alloy, having sequentially deposited thereon a plating layer 11, such as of amorphous nickel-phosphors (Ni—P); an amorphous seed layer 12A, e.g., of NiAl; a polycrystalline underlayer 12B, typically of chromium (Cr) or a Cr-based alloy; a magnetic layer 13, e.g., of a cobalt (Co)-based alloy; a protective overcoat layer 14, typically containing carbon (C), e.g., diamond-like carbon ("DLC") formed, as is known, by sputtering of a carbon target in an appropriate atmosphere or by ion beam deposition ("IBD") utilizing appropriate precursor gases; and a lubricant topcoat layer 15, typically of a perfluoropolyether compound applied, as is known, by dipping, spraying, etc. The magnetic layer 13, typically comprised of a Co-based alloy, may be formed by sputtering techniques and includes polycrystallites epitaxially grown on the polycrystalline Cr or Cr-based alloy underlayer 12B.

In operation of medium 1, the magnetic layer 13 can be locally magnetized by a write transducer, or write "head", to record and thereby store information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Thin film magnetic recording media are conventionally employed in hard disk form for use with disk drives for storing large amounts of data in magnetizable form.

Typically, one or more disks are rotated about a central axis in combination with data transducer heads. In operation, a typical contact start/stop ("CSS") method commences when the transducer head, carried by an air-bearing slider, begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the surface of the disk. Thus, the transducer head contacts the disk surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

The air bearing design for the head slider/transducer utilized for CSS-type operation as described above provides an interface between the slider and the disk which prevents damage to the disk over the life of the disk/slider/transducer head system, and provides damping in the event the disk drive system undergoes mechanical shock due to vibrations of external origin. The air bearing also provides the desired spacing between the transducer and the disk surface. A bias force is applied to the slider by a flexure armature in a direction toward the disk surface. This bias force is counteracted by lifting forces from the air bearing until an equilibrium state is achieved. The slider will contact the disk surface if the rotating speed of the disk is insufficient to cause the slider to "fly", as during startup and shut-down phases of the CSS cycle. If the slider contacts a data region of the disk, the data may be lost and the disk permanently damaged.

Referring now to FIG. 2, shown therein in simplified, schematic perspective view, is a conventionally configured magnetic hard disk 30 having a CSS (i.e., "landing") zone 36 and a data (i.e., recording) zone 40. More specifically, FIG. 2 illustrates an annularly-shaped magnetic hard disk 30 including an inner diameter 32 and an outer diameter 34. Adjacent to the inner diameter is an annularly-shaped, inner CSS or "landing" zone 36. When disk 30 is operated in conjunction with a magnetic transducer head (not shown in the drawing), the CSS or "landing" zone 36 is the region where the head makes contact with the disk surface during the above-described start-stop cycles or other intermittent occurrences. In FIG. 2, the radially outer edge of the CSS or "landing" zone 36 is indicated by line 38, which is the boundary between CSS zone 36 and data zone 40 where information in magnetic form is stored within the magnetic recording medium layer of disk 30.

It is generally considered desirable for reliably and predictably performing reading and recording operations, and essential for obtaining high areal density magnetic recording, that the transducer head be maintained as close to the disk surface as possible in order to minimize its flying height. Thus, a smooth disk surface is preferred, as well as a smooth opposing surface of the transducer head, thereby permitting the head and the disk to be positioned in very close proximity, with an attendant increase in predictability and consistent behavior of the air bearing supporting the transducer head during motion. However, if the head surface and the recording surface are too flat, the precision match of these surfaces gives rise to friction and "stiction", i.e., a combination of friction and "stickiness" (resulting from viscous shear forces) at the disk surface which causes the transducer head to adhere to the surface, particularly after periods of non-use, thereby making it more difficult for the transducer head to initiate movement therefrom. Excessive stiction and friction during the start-up and stopping phases of the above-described cyclic sequence causes wear of the transducer and disk 25 surfaces, eventually leading to what is referred to as "head crash". Another drawback associated with smooth disk surfaces is lack of durability resulting from the very small amount of lubricant which is retained thereon. Thus, there are competing goals of minimizing transducer head flying height (as by the use of smooth surfaces) and reducing transducer head/disk friction (as by avoiding use of smooth surfaces).

Conventional practices for addressing these apparent competing objectives include providing at least the CSS or "landing" zone of the magnetic disk recording medium with a roughened surface to reduce transducer head/disk friction and stiction by a number of different techniques generally known as "texturing", such as disclosed in U.S. Pat. Nos. 5,626,941; 5,635,269; 5,714,207; 5,718,811; 5,768,076; 5,798,164; 5,945,197; and 6,020,045, the entire disclosures of which are incorporated herein by reference. Referring again to FIG. 1, suitable texturing techniques include, inter alia, circumferential polishing and localized laser heating of the surface of the disk substrate 10 (e.g., of Al—Mg alloy) to create thereon a texture pattern comprising a plurality of spaced apart projections ("bumps") prior to deposition thereon of a layer stack comprised of plating layer 12, polycrystalline seed or underlayer 12, magnetic layer 13, protective overcoat 14, and lubricant topcoat 15, wherein the textured surface of the underlying disk substrate 10 is substantially replicated in the subsequently deposited, overlying layers. According to such methodology, by providing a textured surface in at least the CSS or "landing" zone, the transducer head is able to rest and slide on the peaks of the projections or "bumps" during starting and stopping, thereby reducing the area of contact between the transducer head and the magnetic medium. As a consequence of the reduced area of contact in the CSS or "landing" zone, the amount of force necessary to initiate movement of the transducer head is considerably reduced. An additional advantage provided by the textured disk surface is the ability to retain a greater amount of lubricant, thereby further increasing disk durability by reducing friction and stiction.

A variety of possible configurations of the textured surface approach for reducing stiction and friction between the transducer head and the disk surface are possible, including texturing only the CSS or "landing" zone, wherein specular smoothness of the data zone is retained for permitting high bit density recording by allowing for very low head flying height; texturing the entire disk surface, i.e., the CSS and data zones, whereby friction and stiction reduction is provided in the data zone in addition to the CSS zone; and separately (i.e., differently) textured CSS and data zones, with and without a transition zone between the differently textured zones, wherein the texturing is optimized for each type of zone to maximize both recording characteristics and mechanical durability.

As previously indicated, in magnetic data/information recording, storage, and retrieval technology, it is continually desired to improve the areal density at which data/information can be recorded and reliably read. Because the recording density of a hard disk and its associated drive mechanism is limited by the distance between the transducer head and the surface of the magnetic medium, a goal of air bearing slider design for use in CSS operation, as described above, is to "fly" the slider as closely as possible to the medium surface while avoiding physical contact or impact with the medium. Smaller spacings, or "fly heights", are desired so that the transducer head can distinguish between the various magnetic fields emanating from closely spaced regions on the data zone of the disk surface.

The design of the CSS, or landing zone, of advanced, high areal recording density magnetic hard disk media for use with sliders operating at very low flying heights, i.e., 0.7 $\mu$ inch or less, poses a challenge because the conventional laser zone texturing ("LZT") technique appropriate for non-padded head sliders is fast approaching its technical limit in that further reduction in bump height to below about 130 Å, e.g., in order to provide lower flying heights of about 0.5 $\mu$ inch, will inevitably incur stiction failures due to onset of stiction "avalanche". Stated somewhat differently, stiction cannot be adequately controlled (i.e., moderated) for transducer head sliders operating at such low flying heights, unless relatively tall laser bumps, i.e., greater than about 130 Å, are employed. However, use of such tall bumps entails an increased likelihood of head-disk interference which can result in catastrophic head-disk failures, such as crashes.

As is evident from the foregoing, it is essential that the laser bump geometry be optimized for stiction, friction, and durability of the transducer head-media interface. Specifically, a laser bump height which is too low may result in a high rate of stiction-related failure, whereas a laser bump height which is too high may reduce media durability. The requirements ("spec limits") on the laser bump height become increasingly stringent as the transducer head-to-media spacing is decreased in order to increase areal recording density. At the same time, the laser texturing process itself determines the tolerance of laser bump height control, the latter having already been optimized and which cannot be further improved without incurring additional capital investment in the laser processing system. Thus, as the laser bump height "spec range" approaches the manufacturing tolerance, an increasing amount or proportion of the produced laser bumps will fail to be within the "spec limits" and either cause stiction failures (at low bump heights) or durability failures (at high bump heights).

The above-described mismatch between process capability and tolerance requirements effectively limits the ability to extend the laser zone texture (LZT)-based CSS technology in the fabrication of very high areal recording density magnetic media. In addition to this, it is considered essential that for further significant increase in areal recording density to be realized, perpendicular rather than longitudinal media (i.e., media where the orientation direction of magnetization of the individual grains of the magnetic recording layer is perpendicular rather than parallel to the longitudinal direction of the media) must be utilized, as well as glass-based rather than conventional NiP-plated, Al-based substrates. However, in addition to being limited by the same laser bump height tolerance control as conventional NiP-plated, Al-based substrates, functionally suitable laser texturing of glass-based substrates will require substantial new capital investment in infra-red (IR) lasers and may also incur severe, if not fatal, corrosion-associated problems if multi-phase crystalline glass substrates are utilized.

In view of the foregoing, there exists a need for an improved method for texturing at least the surface of the CSS zone of a magnetic recording medium or substrate therefor, which method substantially eliminates or entirely avoids the above-described drawbacks and disadvantages associated with LZT processing. In addition, there exist a need for high areal recording density magnetic media in disk form and which include an improved textured CSS or landing zone.

The present invention addresses and solves problems attendant upon the manufacture of high areal recording density magnetic hard disk media with textured CSS or landing zones for use with read/write transducers in the form of head sliders operating at very low glide heights, while maintaining full compatibility with all mechanical aspects of conventional hard disk drive technology. Moreover, manufacture and implementation of the present invention can be obtained at a cost comparable to that of existing automated technology for the fabrication of hard disk magnetic recording media.

DISCLOSURE OF THE INVENTION

An advantage of the present invention is an improved method of texturing a surface of a substrate.

Another advantage of the present invention is an improved method of texturing a CSS or landing zone of a an annular disk-shaped substrate for a hard disk magnetic recording medium for reducing stiction and friction of the medium when utilized with a read/write transducer operating at a very low flying height.

Yet another advantage of the present invention is an improved substrate for a hard disk magnetic recording medium which includes an ion-implanted, surface-textured CSS or landing zone.

Still another advantage of the present invention is an improved hard disk magnetic recording medium which includes an ion-implanted, surface-textured CSS or landing zone.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of texturing a surface of a substrate, comprising steps of:

(a) providing a substrate having a surface;

(b) providing a mask in overlying relation to the substrate surface, the mask comprising a layer of a material including a patterned plurality of openings extending therethrough;

(c) bombarding the mask with ions to selectively implant the ions in portions of the substrate surface aligned with and selectively exposed by the patterned plurality of openings, whereby the height of the selectively ion-implanted portions of the substrate surface is increased or decreased relative to the height of non-ion-implanted portions of the substrate surface, thereby providing the substrate surface with a texture pattern corresponding to the patterned plurality of openings extending through the mask.

According to embodiments of the present invention, step (a) comprises providing a non-magnetic substrate for a hard disk magnetic recording medium, the substrate including at least one major surface having a contact start/stop (CSS) or landing zone and a data zone; and in accordance with certain alternative embodiments of the present invention, step (a) comprises providing a nonmagnetic substrate wherein the substrate surface is bare or is covered by at least one layer of a laminate of layers comprising the magnetic recording medium.

Embodiments of the present invention include the step (a) of providing a non-magnetic substrate comprised of a material selected from the group consisting of Al, Al/NiP, Al-based alloys, other metals, other metal alloys, polymers, and polymer-based materials, or a high modulus, hard-surfaced material selected from the group consisting of glass, ceramics, and glass-ceramics.

According to a particular embodiment of the present invention, step (a) comprises providing an annular disk-shaped substrate wherein the CSS or landing zone comprises an annularly-shaped zone adjacent an inner or outer diameter of the disk and the data zone comprises an annularly-shaped zone radially adjacent the CSS or landing zone; step (b) comprises providing the mask in overlying relation to the substrate surface such that the patterned plurality of openings extending therethrough selectively expose portions of the substrate surface comprising the CSS or landing zone, whereby the substrate surface in the CSS or landing zone is selectively provided with a texture for minimizing stiction and friction when utilized with a read/write transducer operating at a low flying height over the surface.

In accordance with alternative embodiments of the present invention, step (b) comprises providing a contact mask or a non-contacting projection mask.

According to a particular embodiment of the present invention, step (b) comprises providing a mask wherein each of the patterned plurality of openings has a maximum lateral dimension in the range from about 0.1 to about 50 $\mu$m and adjacent openings are spaced apart from about 0.1 to about 50 $\mu$m; step (c) comprises implanting the ions into the selectively exposed portions of the substrate surface in the CSS or landing zone to increase or decrease the height of the selectively ion-implanted portions from about 1 to about 100 Å relative to the height of the non-ion-implanted portions of the substrate surface in the CSS or landing zone, the change in height being determined by selection of the substrate material and ion species, dosage, and energy.

In accordance with embodiments of the present invention, step (c) comprises bombarding the mask with ions of sufficient energy so as to substantially avoid or at least minimize sputtering of the selectively ion-implanted portions of the substrate surface in the CSS or landing zone; e.g., step (c) comprises implanting at least one ion species selected from among rare gas ions (He, Ne, Ar, Xe, and Kr), H, B, C, and N ions, at an implantation energy and dosage from about 1 keV to about 10 MeV and from about $10^{12}$ to about $10^{18}$ ions/cm$^2$, respectively.

According to a particular embodiment of the present invention, step (a) comprises providing a non-magnetic, annular disk-shaped substrate for a magnetic recording medium, the substrate including at least one major surface having a contact start/stop (CSS) or landing zone and a data zone, the CSS or landing zone comprising an annularly-shaped zone adjacent an inner or outer diameter of the disk and the data zone comprising an annularly-shaped zone radially adjacent said CSS or landing zone;

step (b) comprises providing a mask in overlying relation to the substrate surface such that the patterned plurality of openings extending therethrough selectively expose portions of the substrate surface comprising the CSS or landing zone; and step (c) comprises implanting the ions into the selectively exposed portions of the substrate surface in the CSS or landing zone to increase or decrease the height of the selectively ion-implanted portions relative to the height of the non-ion-implanted portions of the substrate surface in the CSS or landing zone, whereby the substrate surface in the CSS or landing zone is selectively provided with a texture for minimizing stiction and friction when utilized with a read/write transducer operating at a low flying height over the surface, wherein:

step (a) comprises providing a substrate comprised of a material selected from the group consisting of Al, Al/NiP, Al-based alloys, other metals, other metal alloys, polymers, and polymer-based materials, or a high modulus, hard-surfaced material selected from the group consisting of glass, ceramics, and glass-ceramics, the substrate surface being bare or covered by at least one layer of a laminate of layers comprising the magnetic recording medium;

step (b) comprises providing a mask wherein each of the patterned plurality of openings has a maximum lateral dimension in the range from about 0.1 to about 50 μm and adjacent openings are spaced apart from about 0.1 to about 50 μm;

and step (c) comprises implanting the ions into the selectively exposed portions of the substrate surface in the CSS or landing zone to increase or decrease the height of the selectively ion-implanted portions from about 1 to about 100 Å relative to the height of the non-ion-implanted portions of the substrate surface in the CSS or landing zone, the change in height being determined by selection of the substrate material and species, dosage, and energy of the implanted ions, the energy of the implanted ions being sufficient to substantially avoid or at least minimize sputtering of the selectively ion-implanted portions of the substrate surface in the CSS or landing zone.

Another aspect of the present invention is a hard disk magnetic recording medium manufactured according to the above method.

Yet another aspect of the present invention is a non-magnetic substrate for a hard disk magnetic recording medium, comprising:

a non-magnetic annular disk, the annular disk including at least one major surface having a contact start/stop (CSS) or landing zone and a data zone, the CSS or landing zone comprising an annularly-shaped zone adjacent an inner or outer diameter of the disk and the data zone comprising an annularly-shaped zone radially adjacent the CSS or landing zone; wherein the substrate surface in the annularly-shaped CSS or landing zone is textured and includes a patterned plurality of spaced-apart, ion-implanted bumps or depressions for decreasing stiction and friction when the substrate forms part of a hard disk magnetic recording medium utilized with a read/write transducer operating at a very low flying height.

According to certain embodiments of the present invention, each of the patterned plurality of spaced-apart, ion-implanted bumps or depressions for decreasing stiction and friction has a height or depth in the range from about 1 to about 100 Å, a maximum lateral dimension in the range from about 0.1 to about 50 μm, and a spacing between adjacent bumps in the range from about 0.1 to about 50 μm; and the annular disk comprises a non-magnetic material selected from the group consisting of Al, Al/NiP, Al-based alloys, other metals, other metal alloys, polymers, and polymer-based materials, or a high modulus, hard-surfaced material selected from the group consisting of glass, ceramics, and glass-ceramics.

Still another aspect of the present invention is a hard disk magnetic recording medium comprising the substrate as formed above, further including a laminate of layers overlying the data zone, the laminate including at least one magnetic recording layer.

Yet another aspect of the present invention is a hard disk magnetic recording medium, comprising:

(a) a non-magnetic substrate; and
(b) means for reducing stiction and friction of a CSS or landing zone of the medium.

According to an embodiment of the invention, the non-magnetic substrate is an annular disk and the CSS or landing zone forms an annularly-shaped zone adjacent an inner or outer diameter of the disk.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawing, in which the features are not drawn to scale but rather are drawn as to best illustrate the pertinent features, wherein:

FIGS. 3(A)–4(B) schematically illustrate, in simplified cross-sectional view, part of a sequence of steps for practicing the present invention; and FIGS. 4(A)–4(B) respectively illustrate a checkerboard-patterned mask for use according to the invention and a graph showing the corresponding height variation of a substrate surface produced according to the inventive methodology, as measured by Atomic Force Microscopy (AFM), taken along the solid vertical line of FIG. 3(A).

DESCRIPTION OF THE INVENTION

Figure 1:
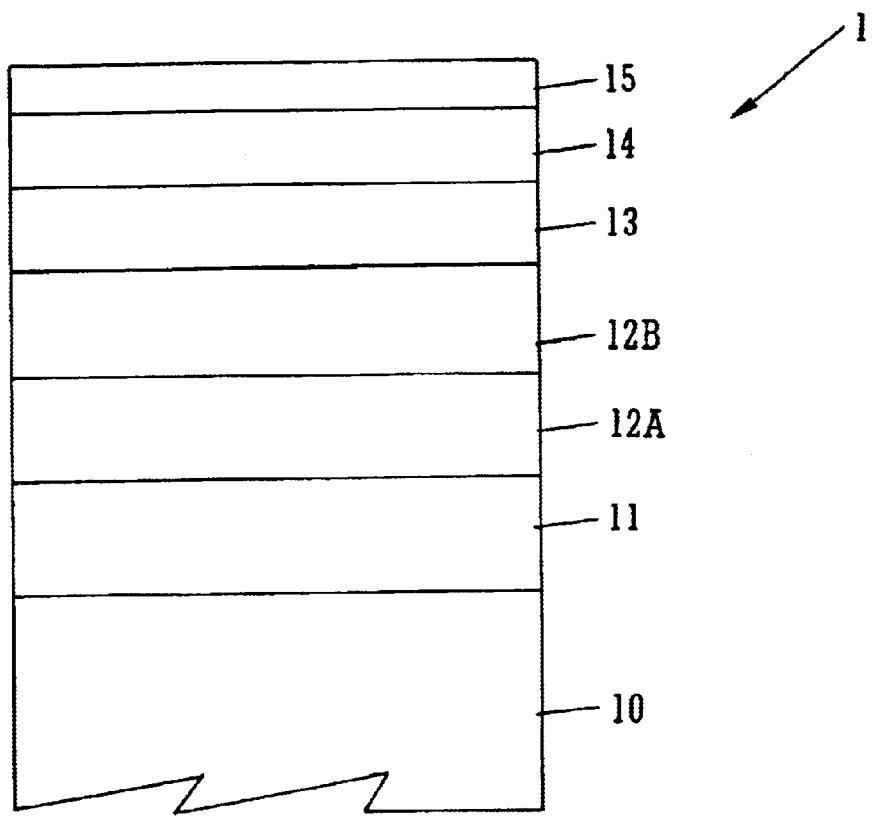
FIG. 1 schematically illustrates, in simplified cross-sectional view, a portion of a conventional thin-film magnetic disk recording medium.

The present invention addresses and solves problems attendant upon the use of conventional techniques for forming texture patterns in specific surface areas or zones of a magnetic recording medium, e.g., the CSS landing zone of disk-shaped, high areal density magnetic recording media, and is based upon the discovery that conventional surface texturing techniques, e.g., laser texturing, incur several significant drawbacks when utilized for texturing of the CSS or landing zone of high areal recording density magnetic media. Specifically, conventional laser texturing methodologies and instrumentalities which utilize lasers operating outside of the IR range of the electromagnetic spectrum cannot be readily applied to glass, ceramics, or glass-ceramic substrates, and modification of existing laser texturing equipment or acquisition of laser texturing equipment capable of operating in the IR range will add significant cost to the manufacturing process. Moreover, as described supra, the laser texturing process is inherently imprecise, and, as the laser bump height "spec range" approaches the manufacturing tolerance for laser processing of substrates for very high areal recording density media, an increased proportion of the laser-produced bumps will fail to be within the "spec limits". In addition, the imprecise nature of the laser texturing process disadvantageously decreases the usable width of the data recording zone or band of the disk-shaped media and results in poor alignment of the laser-produced texture with the data tracks, principally resulting from the latter being written at a different time than when the laser texturing is performed.

According to the present invention, each of the difficulties, disadvantages, and drawbacks of the conventional laser texturing methodology is overcome by means of a simple, rapid, cost-effective, and conveniently performed ion implantation process, wherein a texture pattern comprising a plurality of accurately-dimensioned, precisely spaced-apart protrusions ("bumps") or depressions is formed in the CSS or landing zone of a substrate for a magnetic recording medium, e.g., an annular disk-shaped substrate, whereby a texture pattern is created which eliminates, or at least substantially reduces, undesirable interference with the operation of the flying head of a hard disk-based data/information recording, storage, and retrieval system. The ion implantation process of the invention is applicable to all manner of substrate materials utilized in the fabrication of thin film magnetic recording media, whether comprised of a metal, e.g., Al or Al/NiP; a metal alloy, e.g., Al—Mg; polymer; glass; ceramics; glass-ceramics; or composites of the aforementioned materials. Moreover, the inventive process is ideally suitable for processing high modulus, very hard-surfaced substrate materials, e.g., of glass, ceramics, or glass-ceramics. An additional advantage of the inventive methodology for patterning is the ability to form appropriately textured CSS or landing zones either on bare substrates (i.e., prior to deposition thereon of the layer stack constituting the magnetic recording medium), or on substantially finished media (i.e., after layer stack deposition thereon). A still further advantage provided by the present invention is the precise alignment of the patterned landing and data zones arising from use of a precisely-dimensioned, accurately positionable ion implantation mask, whereby the area of the data zone lost to tolerance requirements is minimized. Moreover, according to the inventive methodology, the geometrical shape of the mask openings is not critical for practice of the invention. Thus, the openings may be of practically any shape, e.g., circular, oval, square, rectangular, triangular, linear, etc., with only the width (i.e., the maximum lateral dimension) thereof being significant.

Figure 2:
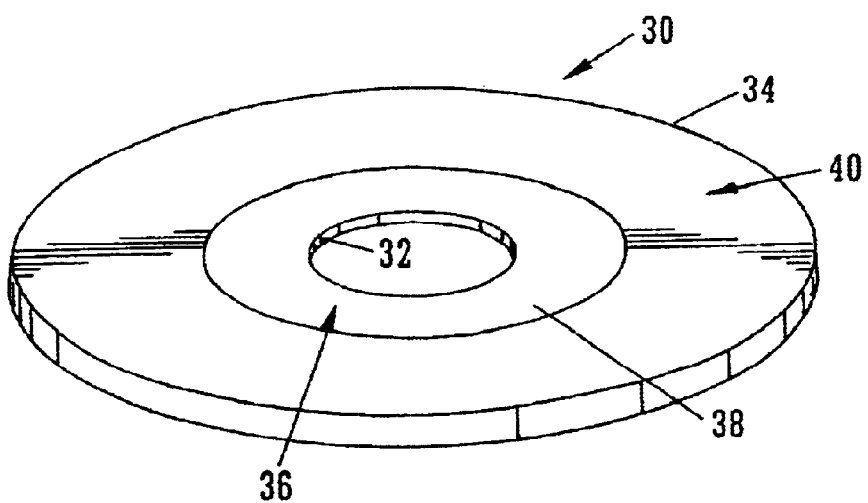
FIG. 2 schematically illustrates, in simplified perspective view, an annular disk-shaped magnetic recording medium suitable for use as a hard disk.
Figures 3A, 3B:
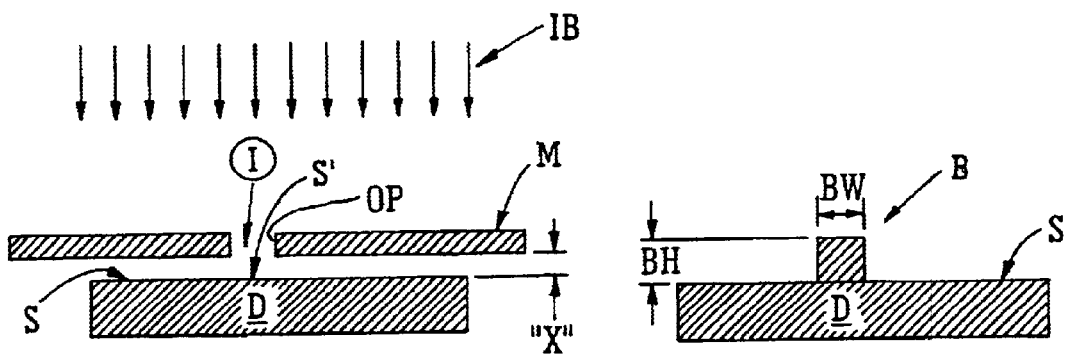

Referring now to FIGS. 3(A)–3(B), illustrated therein in simplified, schematic cross-sectional view, is a sequence of steps for performing an embodiment of an ion implantation surface texturing process according to the present invention. According to a preliminary step of the embodiment, a suitable substrate D having a surface S adapted for implantation texturing is initially provided. By way of illustration, but not limitation, substrate D may be an annular disk-shaped, non-magnetic substrate for a hard disk magnetic recording medium, the substrate including at least one major surface S having a contact start/stop (CSS) or landing zone and a data zone (e.g., as shown in FIG. 2). The major surface S of substrate D may be bare or covered by at least one layer forming part of a stacked laminate of layers comprising the magnetic recording medium (as, for example, layers 11–15 illustrated in FIG. 1); the non-magnetic substrate may be comprised of a material selected from the group consisting of Al, Al/NiP, Al-based alloys, other metals, other metal alloys, polymers, and polymer-based materials, or a high modulus, hard-surfaced material selected from the group consisting of glass, ceramics, and glass-ceramics; and the CSS or landing zone comprises an annularly-shaped zone adjacent an inner or outer diameter of the. disk and the data zone comprises an annularly-shaped zone radially adjacent said CSS or landing zone.

Still referring to FIG. 3(A), according to the next step of the inventive methodology, a mask M comprising a plurality of openings OP extending through the thickness thereof and arranged in a desired pattern (only one opening OP is shown in the figure for illustrative simplicity) is provided in overlying relation to surface S of substrate D to expose surface portion S'. Illustratively, the pattern of openings OP for forming a textured CSS landing zone may be arranged in an annularly-shaped ring or band adjacent the inner or outer diameter of substrate S, and each of the patterned plurality of openings OP may have a maximum lateral dimension in the range from about 0.1 to about 50 $\mu$m, with adjacent openings being spaced apart from about 0.1 to about 50 $\mu$m.

Mask M may contact surface S of the substrate (termed a "contact mask") or spaced therefrom at a predetermined distance x. The latter type masks are further classified as "shadow" or "projection" masks, depending upon the mask-surface distance x. More specifically, if the mask is placed very close to but not in contact with the substrate (disk) surface S, e.g., less than about 1 mm away from surface S, the mask is termed a "shadow" mask; whereas, if the mask is positioned at a large distance x from surface S, the mask is termed a "projection" mask. In the former instance, i.e., with the shadow mask, the feature resolution on the disk surface is determined by the divergence angle of the ion beam utilized for bombarding and implanting of the ions in surface portions S'. In the latter instance, i.e., with the projection mask, ion optics must be provided for ensuring proper focussing of the ion beam.

When the ion implantation process according to the present invention is utilized for texturing the CSS or landing zone of substrate D, since the desired feature size of the textured CSS or landing zone is a few $\mu$m (noting that current laser texturing of the CSS or landing zone provides feature sizes with a diameter of several $\mu$m), a silicon (Si) stencil can be utilized, or a suitable mask may be fabricated from a thin metal sheet, e.g., of Cr, Mo, etc., by means of conventional photolithographic masking/etching techniques. In general, the minimum thickness of the mask is determined by the ion stopping or blocking range of the particular material, and typically is about 0.1 $\mu$m for the above-recited materials. There is no specific upper limit on mask thickness, provided 0.1–1 $\mu$m-sized features (i.e., through-holes) can be formed therein.

With reference to FIGS. 3(A) and 3(B), in the next step according to the invention, substrate D, together with overlying patterned mask M, are subjected to bombardment with an ion beam IB from a suitable ion beam source, e.g., of He, Ne, or Ar ions (not shown in the figure for illustrative simplicity), in order to selectively implant ions I in the portions S' of surface S of substrate D exposed through the openings OP in mask M. According to the invention, the lateral dimension, i.e., bump width BW of the bumps B produced in the selectively exposed surface portions S', is determined by the lateral dimension of the mask openings OP, and the bump height BH is determined by a combination of the disk material and the ion implantation parameters, namely the ion species, ion energy, and ion dosage. The ion dosage can be precisely controlled by the ion beam current. Importantly, the ion energy must be sufficiently high as to ensure implantation of a large proportion of the incident bombarding ions, with minimal sputtering of the exposed substrate surface portions S', in order to avoid loss, i.e., erosion, of substrate material.

Suitable ion species for implantation texturing of substrates comprised of the aforementioned non-magnetic materials, including glass-based substrates, include rare gas ions such as He, Ar, Ne, Kr, and Xe, as well as other elements, e.g., H. B, C, and N ions. The ion beam source may be selected so as to provide a wide, collimated beam of ions, in which case the ion beam may be stationary, i.e., scanning of the ion beam over the substrate surface to be textured is not required. However, in such instance, the mask/substrate assembly may, if desired, be translated, e.g., rotated about a central axis, in order to provide uniform ion bombardment/implantation of a large surface area, such as an annularly-shaped CSS or landing zone adjacent an inner or outer diameter of a disk-shaped substrate. Alternatively, the ion beam may be focussed and scanned over the surface area desired to be textured.

EXAMPLE

Figure 4A:
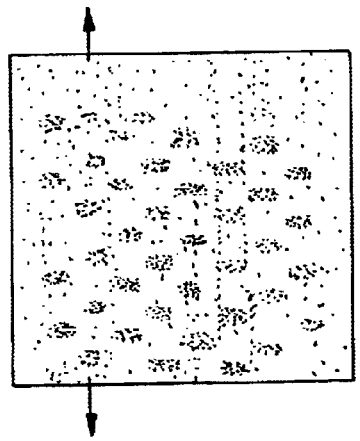
Figure 4B:
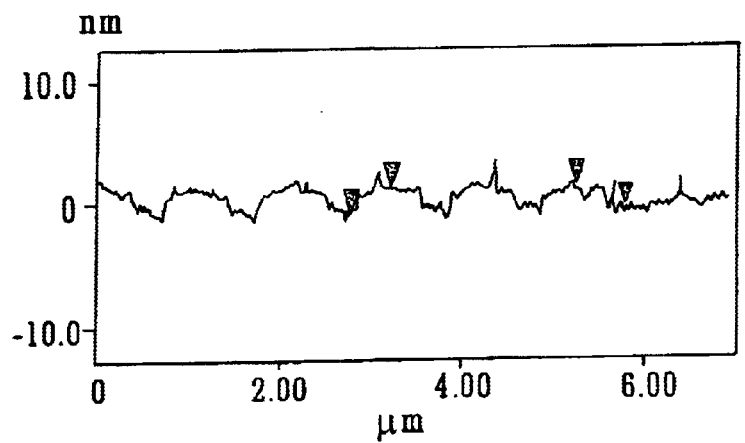

An aluminum (Al) substrate for a hard disk magnetic recording medium was subjected to selective implantation of Ar ions of 25 KeV energy at a dosage of about $4.9 \times 10^{15}$ ions/cm$^2$, using a photolithographically patterned photoresist layer formed on the surface of the Al disk as an implantation mask. As may be 10 seen from the Atomic Force Microscopy ("AFM") image of FIG. 4(A), the mask pattern comprised a checkerboard array of rectangularly-shaped openings, each opening having a width of about 0.5 $\mu$m and a length of about 0.65 $\mu$m, with a spacing of about 0.4 $\mu$m between adjacent openings in neighboring rows and columns. FIG. 4(B) is a trace of the variation in surface height or level, taken along the vertical line in FIG. 4(A). As is evident from FIG. 4(B), the surface of the selectively ion-implanted substrate exhibits variations in height corresponding the mask pattern. That is, the height of the selectively ion-implanted surface portions S' is increased (i.e., "swelled") relative to that of the non-ion-implanted surface portions, in effect creating a plurality of surface "bumps" akin to bump B schematically shown in cross-sectional view in FIG. 3(B). Specifically, the average bump height BH, bump width BW, and bump spacing are 2 nm, 0.6 $\mu$m, and 0.4 $\mu$m, respectively.

While selective ion implantation of Al-based substrates, as described supra, results in the formation of protrusions ("bumps") at the selectively ion-implanted areas of the disk surface, similar selective ion implantation of glass-based disk substrates results in the formation of depressions rather than bumps.

While not desirous of being bound by any particular theory or mechanism, it is nonetheless believed that the formation of bumps or depressions upon ion implantation of selected surface areas of the substrate is related to the porosity of the disk material. Thus, materials having pores or voids therein, such as glass materials, may be compressed at the ion implanted areas due to collapse of the pores arising from the ion bombardment, whereas materials, such as of Al, not having pores therein are expanded ("swelled") due to incorporation of implanted ions in the lattice thereof.

Thus, as illustrated by the above Example, the inventive ion implantation methodology affords a controllable, rapid, reliable, and cost-effective method for providing the surfaces of a wide variety of substrates with a desired texture. By way of illustration only, the inventive methodology is ideally suited for achieving high areal density magnetic recording media and apparatus with good tribological performance when utilized with read/write transducers operating at very low flying heights. In addition, the inventive methodology provides a significant improvement over the capabilities of conventional laser zone texturing (LZT) methodology for surface texturing the CSS or landing zone of magnetic hard disk media and avoids the limitations inherent therein pertaining to the tolerance of laser bump height control. Moreover, the ion implantation texturing process according to the invention can be practiced on bare substrates prior to magnetic layer stack formation thereon, or alternatively, the inventive method can be practiced with substrates with one or more or of the layers of the layer stack formed thereon. Finally, the present invention is fully compatible with all other aspects of automated manufacture of thin film magnetic media.

In the previous description, numerous specific details are set forth, such as specific materials, structures, reactants, processes, etc., in order to provide a better understanding of the present invention. However, the present invention can be practiced without resorting to the details specifically set forth. In other instances well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of texturing a surface of a substrate, comprising steps of:
    (a) providing a substrate having a surface;
    (b) providing a mask in overlying relation to said substrate surface, said mask comprising a layer of a material including a patterned plurality of openings extending therethrough;
    (c) bombarding said mask with ions to selectively implant said ions in portions of said substrate surface aligned with and selectively exposed by said patterned plurality of openings, whereby the height of said selectively ion-implanted portions of said substrate surface is increased or decreased relative to the height of non-ion-implanted portions of said substrate surface, thereby providing said substrate surface with a texture pattern corresponding to said patterned plurality of openings extending through said mask.

2. The method as in claim 1, wherein:
    step (a) comprises providing a non-magnetic substrate for a hard disk magnetic recording medium, said substrate including at least one major surface having a contact start/stop (CSS) or landing zone and a data zone.

3. The method as in claim 2, wherein:
    step (a) comprises providing a non-magnetic substrate wherein said substrate surface is bare or is covered by at least one layer of a laminate of layers comprising said magnetic recording medium.

4. The method as in claim 2, wherein:
step (a) comprises providing a non-magnetic substrate comprised of a material selected from the group consisting of Al, Al/NiP, Al-based alloys, other metals, other metal alloys, polymers, and polymer-based materials, or a high modulus, hard-surfaced material selected from the group consisting of glass, ceramics, and glass-ceramics.

5. The method as in claim 2, wherein:
step (a) comprises providing an annular disk-shaped substrate wherein said CSS or landing zone comprises an annularly-shaped zone adjacent an inner or outer diameter of said disk and said data zone comprises an annularly-shaped zone radially adjacent said CSS or landing zone.

6. The method according to claim 5, wherein:
step (b) comprises providing a said mask in overlying relation to said substrate surface such that said patterned plurality of openings extending therethrough selectively expose portions of said substrate surface comprising said CSS or landing zone, whereby said substrate surface in said CSS or landing zone is selectively provided with a texture for minimizing stiction and friction when utilized with a read/write transducer operating at a low flying height over said surface.

7. The method according to claim 6, wherein:
step (b) comprises providing a contact mask or a non-contacting projection mask.

8. The method according to claim 6, wherein:
step (b) comprises providing a mask wherein each of said patterned plurality of openings has a maximum lateral dimension in the range from about 0.1 to about 50 $\mu$m and adjacent openings are spaced apart from about 0.1 to about 50 $\mu$m.

9. The method according to claim 8, wherein:
step (c) comprises implanting said ions into said selectively exposed portions of said substrate surface in said CSS or landing zone to increase or decrease the height of said selectively ion-implanted portions from about 1 to about 100 Å relative to the height of said non-ion-implanted portions of said substrate surface in said CSS or landing zone, said change in height being determined by selection of the material of said substrate and the ion species, dosage, and energy.

10. The method according to claim 9, wherein:
step (c) comprises bombarding said mask with ions of sufficient energy so as to substantially avoid or at least minimize sputtering of said selectively ion-implanted portions of said substrate surface in said CSS or landing zone.

11. The method according to claim 9, wherein:
step (c) comprises implanting at least one ion species selected from among He, Ne, Ar, Xe, and Kr rare gas ions, and H, B, C, and N ions, at an implantation energy and dosage from about 1 KeV to about 10 MeV and from about $10^{12}$ to about $10^{18}$ ions/cm$^2$ respectively.

12. The method as in claim 1, wherein:
step (a) comprises providing a non-magnetic, annular disk-shaped substrate for a magnetic recording medium, said substrate including at least one major surface having a contact start/stop (CSS) or landing zone and a data zone, said CSS or landing zone comprising an annularly-shaped zone adjacent an inner or outer diameter of said disk and said data zone comprising an annularly-shaped zone radially adjacent said CSS or landing zone;

step (b) comprises providing a said mask in overlying relation to said substrate surface such that said patterned plurality of openings extending therethrough selectively expose portions of said substrate surface comprising said CSS or landing zone; and step (c) comprises implanting said ions into said selectively exposed portions of said substrate surface in said CSS or landing zone to increase or decrease the height of said selectively ion-implanted portions relative to the height of said non-ion-implanted portions of said substrate surface in said CSS or landing zone, whereby said substrate surface in said CSS or landing zone is selectively provided with a texture for minimizing stiction and friction when utilized with a read/write transducer operating at a low flying height over said surface.

13. The method as in claim 12, wherein:
step (a) comprises providing a substrate comprised of a material selected from the group consisting of Al, Al/NiP, Al-based alloys, other metals, other metal alloys, polymers, and polymer-based materials, or a high modulus, hard-surfaced material selected from the group consisting of glass, ceramics, and glass-ceramics, said substrate surface being bare or covered by at least one layer of a laminate of layers comprising said magnetic recording medium;

step (b) comprises providing a mask wherein each of said patterned plurality of openings has a maximum lateral dimension in the range from about 0.1 to about 50 $\mu$m and adjacent openings are spaced apart from about 0.1 to about 50 $\mu$m; and step (c) comprises implanting said ions into said selectively exposed portions of said substrate surface in said CSS or landing zone to increase or decrease the height of said selectively ion-implanted portions from about 1 to about 100 Å relative to the height of said non-ion-implanted portions of said substrate surface in said CSS or landing zone, said change in height being determined by selection of the material of said substrate and species, dosage, and energy of said implanted ions, said energy of said implanted ions being sufficient to substantially avoid or at least minimize sputtering of said selectively ion-implanted portions of said substrate surface in said CSS or landing zone.

14. A hard disk magnetic recording medium manufactured according to the method of claim 13.

15. A non-magnetic substrate for a hard disk magnetic recording medium, comprising:
a non-magnetic annular disk, said annular disk including at least one major surface having a contact start/stop (CSS) or landing zone and a data zone, said CSS or landing zone comprising an annularly-shaped zone adjacent an inner or outer diameter of said disk and said data zone comprising an annularly-shaped zone radially adjacent said CSS or landing zone; wherein said substrate surface in said annularly-shaped CSS or landing zone is textured and includes a patterned plurality of spaced-apart, ion-implanted bumps or depressions for decreasing stiction and friction when said substrate forms part of a hard disk magnetic recording medium utilized with a read/write transducer operating at a very low flying height.

16. The substrate according to claim 15, wherein:
each of said patterned plurality of spaced-apart, ion-implanted bumps or depressions for decreasing stiction and friction has a height in the range from about 1 to about 100 Å, a maximum lateral dimension in the range from about 0.1 to about 50 μm, and a spacing between adjacent bumps in the range from about 0.1 to about 50 μm.

17. The substrate according to claim 16, wherein:

said annular disk comprises a non-magnetic material selected from the group consisting of Al, Al/NiP, Al-based alloys, other metals, other metal alloys, polymers, and polymer-based materials, or a high modulus, hard-surfaced material selected from the group consisting of glass, ceramics, and glass-ceramics.

18. A hard disk magnetic recording medium comprising the substrate according to claim 17 and a laminate of layers overlying said data zone, said laminate including at least one magnetic recording layer.

19. A hard disk magnetic recording medium, comprising:

(a) a non-magnetic substrate; and (b) means for reducing stiction and friction of a CSS or landing zone of said medium.

20. The medium according to claim 19, wherein:

said non-magnetic substrate is an annular disk and said CSS or landing zone forms an annularly-shaped zone adjacent an inner or outer diameter of said disk.

* * * * *